United States Patent
Lucas et al.

(10) Patent No.: US 10,372,423 B2
(45) Date of Patent: *Aug. 6, 2019

(54) SYSTEM AND METHOD FOR MANAGING RESOURCES USING A COMPOSITIONAL PROGRAMMING MODEL

(75) Inventors: Bruce David Lucas, Mohegan Lake, NY (US); John Field, Newton, CT (US); Rafah A. Hosn, New York, NY (US); Maria-Cristina V. Marinescu, White Plains, NY (US); Mark N. Wegman, Ossining, NY (US); Charles Francis Wiecha, Hastings on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1424 days.

This patent is subject to a terminal disclaimer.

(21) Appl. No.: 13/216,798

(22) Filed: Aug. 24, 2011

(65) Prior Publication Data

US 2011/0307857 A1 Dec. 15, 2011

Related U.S. Application Data

(63) Continuation of application No. 11/756,707, filed on Jun. 1, 2007, now Pat. No. 8,056,047.

(51) Int. Cl.
G06F 9/445 (2018.01)
G06F 8/30 (2018.01)
G06F 8/72 (2018.01)

(52) U.S. Cl.
CPC . *G06F 8/31* (2013.01); *G06F 8/72* (2013.01)

(58) Field of Classification Search
CPC ..... G06F 8/30; G06F 8/70; G06F 8/31; G06F 8/72
USPC ................... 717/104–123, 127–132
See application file for complete search history.

(56) References Cited

U.S. PATENT DOCUMENTS

| | | |
|---|---|---|
| 5,195,172 A | 3/1993 | Elad et al. |
| 5,835,683 A | 11/1998 | Corella et al. |
| 6,996,800 B2 | 2/2006 | Lucassen et al. |
| 7,029,306 B2 | 4/2006 | Boloker et al. |
| 8,056,047 B2 * | 11/2011 | Lucas et al. ............ 717/104 |
| 8,689,171 B2 * | 4/2014 | Lucas et al. ............ 717/104 |
| 2009/0265686 A1 | 10/2009 | Lucas et al. |

OTHER PUBLICATIONS

Corcho et al., "A Platform for the Development of Semantic Web Portals", Jul. 2006, International Conference on Web Engineering, 8 pages.*

Meier et al., "SozioNet: Networking Social Science Resources", 2003, Springer-Verlag Berlin Heidelberg, pp. 245-256.*

(Continued)

*Primary Examiner* — Ted T. Vo
(74) *Attorney, Agent, or Firm* — Tutunjian & Bitetto, P.C.; David Zwick (57) ABSTRACT

A model is provided for managing resources in a programming environment. A first construct is triggered to update mutable entities in response to changes to related data associated with the mutable entities. In accordance with the updated mutable entities, at least one of a second construct and a third construct is triggered to respectively create a new mutable entity and update a data relationship.

20 Claims, 9 Drawing Sheets

(56) References Cited

OTHER PUBLICATIONS

Decker et al., "TRIPLE—an RDF Rule Language with Context and Use Cases", 2006, retrieved from https://www.w3.org/2004/12/rules-ws/paper/98/, 6 pages.*
Agha et al.; "A Foundation for Actor Computation"; J. Functional Programming 1 (1):1-000, Jan. 1993; 59 pages.
Bonner "Workflow, Transactions and Datalog"; Proceeding of the 18th ACM Symposium on Principles of Database Systems (PODS) May 31-Jun. 2, 1999; 67 pages.
Fielding, "Architectural Styles and the Design of Network-based Software Architectures", PhD thesis, University of California, 2000; 180 pages.
Kiczales et al., "Aspect-Oriented Programming" ACM Computing Surveys 28, 4es; 1996; 14 pages.
Liu, "Extending Datalog with Declarative Updates", Journal of Intelligent Information Systems; 2002; 23 pages.
Milner et al., "A Calculus of Mobile Processes, Part I", Information and Computation 100, 1990; 46 pages.
Milner et al., A Calculus of Mobile Processes, Part I, Information and Computation 100, 1990; 41 pages.
D. Harel et al., Statemate: A Working Environment for the Development of Complex Reactive Systems; IEEE; 1998; 11 pages.
Bernard Houssais, "The Synchronous Programming Language SIGNAL A Tutorial", IRISA. ESPRESSO Project; Apr. 15, 2002; 48 pages.
Topor, "Safe Database Queries with Arithmetic Relations" Proc. of the14th Australian Computer Science Conference; 1991; 12 pages.
X. Wang, "Negation in Logic and Deductive Databases" PhD Thesis; University of Leeds; 1999; 180 pages.
Berry et al., "The Esterel Synchronous Programming Language: Design, Semantics, Implementation", Science of Computer Programming 1992; 51 pages.
Dong et al., "Nonrecursive Incremental Evaluation of Datalog Queries", Database Theory—ICDT' 92, 4th Int'l Conf.; Germany, 1992; revised May 1994; 35 pages.
http://www.flapjax-lang.org/tutorial/; printed May 30, 2007; 10 pages.
Cooper et al., Links: Web Programming without Tiers, ESOP; 2007; 12 pages.
Caspi et al., "LUSTRE: A Declarative Language for Programming Synchronous Systems", 1986; POPL1987; 11 pages.
Paton et al., "Active Database Systems", ACM Comput. Surv. 31, 1 1999; 47 pages.
Harris et al., Composable Memory Transactions: Post-publication version: Aug. 18, 2006; PPoPP '05; 13 pages.
Halbwachs et al., "A Tutorial of Lustre", This Document is an introduction to the language LUSTRE-V4; Jan. 24, 2002; 26 pages.
Bray et al., Extensible Markup Language (XML) 1.0 (Fourth Edition), Aug. 16, 2006: http://www.w3.org/TR/2006/REC-xml-20060816; 2006; 42 pages.
Manola et al., RDF Primer, W3C Recommendation; Feb. 10, 2004; http://www.w3.org/TR/2004/REC-rdf-primer-20040210/; 2004; 78 pages.
Clark et al., XML Path Language (XPath) Version 1.0; W3C Recommendation, Nov. 16, 1999; http://www.w3.org/TR/1999/REC-xpath-19991116; 1999; 33 pages.
Boyer et al., XForms 1.0 (Second Edition) W3C Recommendation, Mar. 14, 2006; http:www.w3.org.TR.2006/REC-xforms-20060314/; 2006; 126 pages.
Zukowski, "The Definitive Guide to Java Swing", 2005, Third Edition, Apress, Chapters 1-4, pp. i-iv, 1-15, 17-57,, 59-65, 67-113.

\* cited by examiner

*every resource of class DATE has a yr, mo. and data resources as its value*
```
<c:with anchor="DATE">
  <c:create-structure>
    <yr/>
    <mo/>
    <da/>
  </c:create-structure>
</c:with>
```

*classify every DATE resource as a DATE3 resource as well*
```
<c:let anchor+"DATE"class="DATE3"/>
```

*every DATE3 resource has three associated input fields whose values are bound to the yr, mo, da values*
```
<c:with anchor="DATE3">
  <c:create-view class="c:INPUT" ref="yr">
    <c::out path="c:label">year</c:out>
  </c:create-view>
  <c:create-view class="c:INPUT" ref="mo">
    <c:out path="c:label">month</c:out>
  </c:create-view>
  <c:create-view class ="c:INPUT" ref="da">
    <c:out path="c:label">day</c:out>
  </c:create-view>
</c:with>
```

SYSTEM AND METHOD FOR MANAGING RESOURCES USING A COMPOSITIONAL PROGRAMMING MODEL

CROSS-REFERENCE TO RELATED APPLICATIONS

This application is a continuation of allowed co-pending U.S. patent application Ser. No. 11/756,707 filed on Jun. 1, 2007, which is incorporated by reference herein in its entirety. This application also claims priority to U.S. Provisional Application Ser. No. 60/860,151 filed Nov. 20, 2006, which is incorporated by reference herein in its entirety.

BACKGROUND

Technical Field

The present invention relates to programming models and more particularly to systems and methods for data-oriented programming models for loosely coupled applications.

Description of the Related Art

While the trend towards loosely-coupled inter-networked software is inexorable, programming models and runtime systems are largely designed for building monolithic, free-standing applications. While the web has vastly increased the scale of distribution, web applications are currently programmed and deployed in a manner not that different from mainframe applications of the 1960s.

The mismatch between programming models/runtimes, and the predominance of inter-networked software is becoming a significant impediment to producing and composing reliable application software in a timely manner—and this mismatch is at the heart of much of the dissatisfaction developers have expressed with the complexity and obscurity of current middleware, programming models, and development tools.

SUMMARY

A system and method for managing resources includes providing mutable entities including related data, and listening for changes in the related data. A first construct is triggered in accordance with the changes in the related data to update the mutable entities. In accordance with an updated mutable entity, at least one of a second construct and a third construct is triggered to respectively create a new mutable entity and update a data relationship.

Present embodiments include a single declarative, data-centric, update-driven, distributed language to support enterprise, web and client applications. A programming model in accordance with the present principles reduces complexity by eliminating multiple redundant abstractions, reduces complexity by facilitating application evolution, and reduces complexity by facilitating flexible deployment and distribution.

An approach to program artifact description that does not impose encapsulation as strictly as in traditional languages is presented. This increases flexibility for subsequent reuse without requiring refactoring or redesign. In one embodiment, resource description framework (RDF) is employed. A declarative data-driven programming model is disclosed for cross-organizational composition, and the attendant distribution of components. The language features support device adaptation and support transformations and mapping among business objects, and between business objects and user interfaces (UI).

A programming model based on the use of resource description framework (RDF) for the data model (distinguished from the normal role of RDF for supporting information ontologies) is provided built on a core subset of RDF including concepts of resource, triple, property, and class, sub-property and sub-class, which also supports distributed data models by using RDF resources identified by URLs (distinguished from RDFs use of the more general URIs to identify resources).

A data model supports multiple and dynamic classification: a resource may have more than one class, and the classification(s) of a resource may programmatically changed at runtime. The data model supports use of multiple and dynamic classification for flexible cross-organizational composition of programs and processes, and supports use of multiple and dynamic classification for flexible cross-organizational composition of programs and processes. The data model also supports use of multiple and dynamic classification for user interface definition, and supports use of multiple and dynamic classification for device adaptation.

A programming model is built on the notion of mutable entities with values that may be read, and whose values evolve overtime by being updated. The programming model employs RDF to model mutable entities by introducing into RDF, the concepts of resources with associated values to model mutable entities. The programming model has associated values of a resource R represented by a tree of RDF nodes and RDF triples rooted at R. The programming model has triples representing values of a resource that are distinguished from triples not representing a value of a resource, thus dividing the RDF graph into two groups: those that represent a tree-structured value of some resource; and those that connect resources in a graph structure. The triples comprising the value of R are distinguished from other graph triples by a predicate that is a subproperty of a distinguished property.

A unifying data model for several data models and related execution models in common use including ER, UML, Relational, XML. RDF may be the basis for the unifying data model.

A data centric execution model, wherein aspects of the programming model (including: encapsulation, composition, process description, asynchrony, user interaction, distribution) may be uniformly described in terms of changes of the runtime state of the program. The runtime state of a program comprises a set of resources and triples included in a triple store. A construct such as <bind> is included that declaratively specifies how the value of a mutable entity changes in response to changes in the values of other mutable entities. RDF may be employed to model mutable entities. The programming construct declaratively provides the programmer access to both the old and the new values of its input data. The programming construct declaratively specifies how the value of a mutable entity changes in response to changes in the values of other mutable entities and permits a programmer to declare each input to be active (triggers the execution of the <bind>) or passive (does not trigger the execution of the <bind>, but may be used as input to it).

A programming model may include XQuery, employed as a language to compute output values from input values. The programming model provides a construct that declaratively specifies the creation of new mutable entities based on current entity values. The programming model may provide a construct that declaratively relates new and existing mutable entities by creating and destroying triples based on current entity values. The programming model may use RDF resources to represent mutable entities. The programming model provides a construct that declaratively changes the classification of new and existing mutable entities based on current entity values. The programming model may employ an execution model that is defined in terms of entity updates. An update is the assignment of a value to an entity.

Each external event, such as a user input, may be manifested in the programming model as an update to a mutable entity. Each update may declaratively trigger further updates to further entities. The programming model may incorporate path expressions that operate over arbitrary graphs for the purpose of identifying the specific entities whose values are declaratively related. RDF data structures may be used for building applications that may be distributed among multiple computing nodes. Execution may be distributed among multiple computing nodes.

A declarative programming model includes a runtime distribution of data structures, and execution is represented orthogonally from the description of the data structures and execution themselves. Cascaded updates may be performed. Web protocols such as HTTP PUT or POST may be employed for the programming model.

A programming model supports a description of user interfaces, or application "front-ends", at a range of levels of abstraction using a uniform recursive MVC pattern, allowing the developer to refine an abstract user interface description through successive levels of more concrete specification. A model of an instance of the MVC pattern is represented by an RDF resource. A view of an instance of the MVC pattern is a set of resources associated with the model. A controller of MVC is a set of constructs that declaratively update the model resource in response to updates to the view resources, and vice versa.

A method for definition of structure and function associated with classes includes supporting flexible multi-organizational composition and adaptation of applications. A programming model uses multiple classifications to support permitting different organizations to independently specify application behavior in a compositional manner, uses multiple classifications to support flexible decomposition of abstractions represented by classifiable entities, and supports the use of multiple classifications to support cross-organization development and composition by allowing each development team to apply classifications to affect the development team's goals.

Dynamic classification can permit the classifications applied by each development team to be specified at any point in the lifecycle of a program artifact, including: at the time the artifact is first defined by its producer; at the time the program artifacts of two development organizations are composed; or at runtime. The programming model supports composable class definitions, in which all aspects of the definition of a class may be independently specified in separate program artifacts. The programming model uses composable class definitions to allow an application provided by one organization to be adapted for use by a different organization. The programming model permits one organization to insert new elements into a user interface defined by another organization, permits one organization to insert new elements into the data structures defined by another organization, and permits one organization to modify processes defined by another organization.

A programming model that supports flexible device adaptation by interfacing with the models at any level of the uniform recursive MVC tree, thus allowing for a spectrum of device adaptation strategies via a common set of language features.

A method for managing resources in a programming environment includes providing mutable entities including related data including triples; listening for changes in the related data; and triggering a first construct in accordance with the changes in the related data to update the mutable entities.

A method for managing resources in a programming environment includes providing mutable entities with class definitions having related data including triples; and in accordance with an anchoring construct, providing a class definition that permits a complete definition of a class to be composed from multiple independently specified sources.

A method for managing resources includes specifying a composition of entities at a plurality of abstraction levels using resource classes, wherein the specifying includes: using a recursive Model View Controller (MVC) pattern including one or more of models, views and controller constructs to define each abstraction level wherein each of the models, the views and the controller constructs includes a set of resources including triples; and updating the models in response to updates in any view by employing the controller constructs to implement the updates.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, a radically simplified declarative programming model and runtime are provided which are expressly targeted at building and deploying cross-organizational software as compositions of web components. In addition, an evolutionary style of software development is supported that permits rapid application prototyping, but also enables progressive refinement of an initial prototype into a hardened asset. A simplified and uniform set of language features addressing end-to-end application design, including business objects, user interaction, and "last-mile" issues such as device adaptation, and multi-modal and multi-device interaction will be described.

In accordance with present embodiments the following advantages may be achieved. A single declarative language is provided to support enterprise, web and client applications, hence reducing complexity from multiple redundant abstractions. A resource description framework (RDF) based approach to the programming model used in accordance with the present principles does not impose encapsulation as strictly as in traditional object-oriented (OO) languages. Cross-organizational composition, and the attendant distribution of components, is easier using declarative data-driven programming models than using procedural or object-oriented languages.

Dealing with the constraints and variety of multiple end-user interaction devices has long been a challenge for user interface (UI) frameworks, whether web based or not. In accordance with the present principles, one contribution to this problem is to approach the problem as a reuse of a uniform set of concepts rather than as an ad-hoc framework addressed specifically to this "last-mile" problem, as has often been the case in the past. We apply the same language features introduced to support transformations and mapping among business objects, and between business objects and the UI, to support device adaptation as well.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A data model in accordance with the present principles is built on a core subset of RDF. The key RDF concepts of resource, triple, property, and class are employed. RDF concepts such as sub-property and sub-class play a role as well. The present embodiments use RDF resources identified by URLs to build a fundamentally distributed data model.

RDF supports multiple and dynamic classification: a resource may have more than one class, and the classification(s) of a resource may programmatically changed at runtime. These features play a role, for such diverse purposes as flexible cross-organizational composition of programs and processes, user interface styling, device adaptation, and so on.

Execution models often center around the notion of mutable entities with values that may be read, and whose values evolve over time by being updated. A data model in accordance with the present principles builds on the RDF model to support such read/update execution models by introducing the concepts of resources with associated values to model mutable entities. The value of a resource R is represented by a tree of nodes and triples rooted at R. The triples comprising the value of R are distinguished from other graph triples by a predicate that is a subproperty of a distinguished property, c:value, defined in accordance with one feature. Thus, graph triples are divided into two groups: those that represent a tree-structured value of some resource; and those that connect resources in a graph structure.

A unifying data model: the present embodiments build on RDF to provide a data model that unifies several data models and related execution models in common use. The following table describes the mapping between present concepts and RDF concepts and each of several popular data models.

TABLE 1

| Collage/RDF | Entity-relationship | UML | Relational | XML |
|---|---|---|---|---|
| class | entity class | class | table | — |
| resource | entity instance | object | row | element, attribute |
| value property | attribute | attribute | column | parent-child relationship |
| value tree | composite attribute | — | — | XML (sub-) tree |
| non-value property | relationship | association | PK/FK | — |

XML data: In accordance with the present principles, a value tree associated with a particular resource may be viewed as an XML document, using a mapping consistent with the RDF/XML serialization of RDF. In one embodiment, the uniform resource identifier (URI) of a resource is a uniform resource locator (URL) so that the XML document that represents the value of a resource may be read or updated using HTTP GET and PUT operations with text/xml message bodies.

Figure 1:
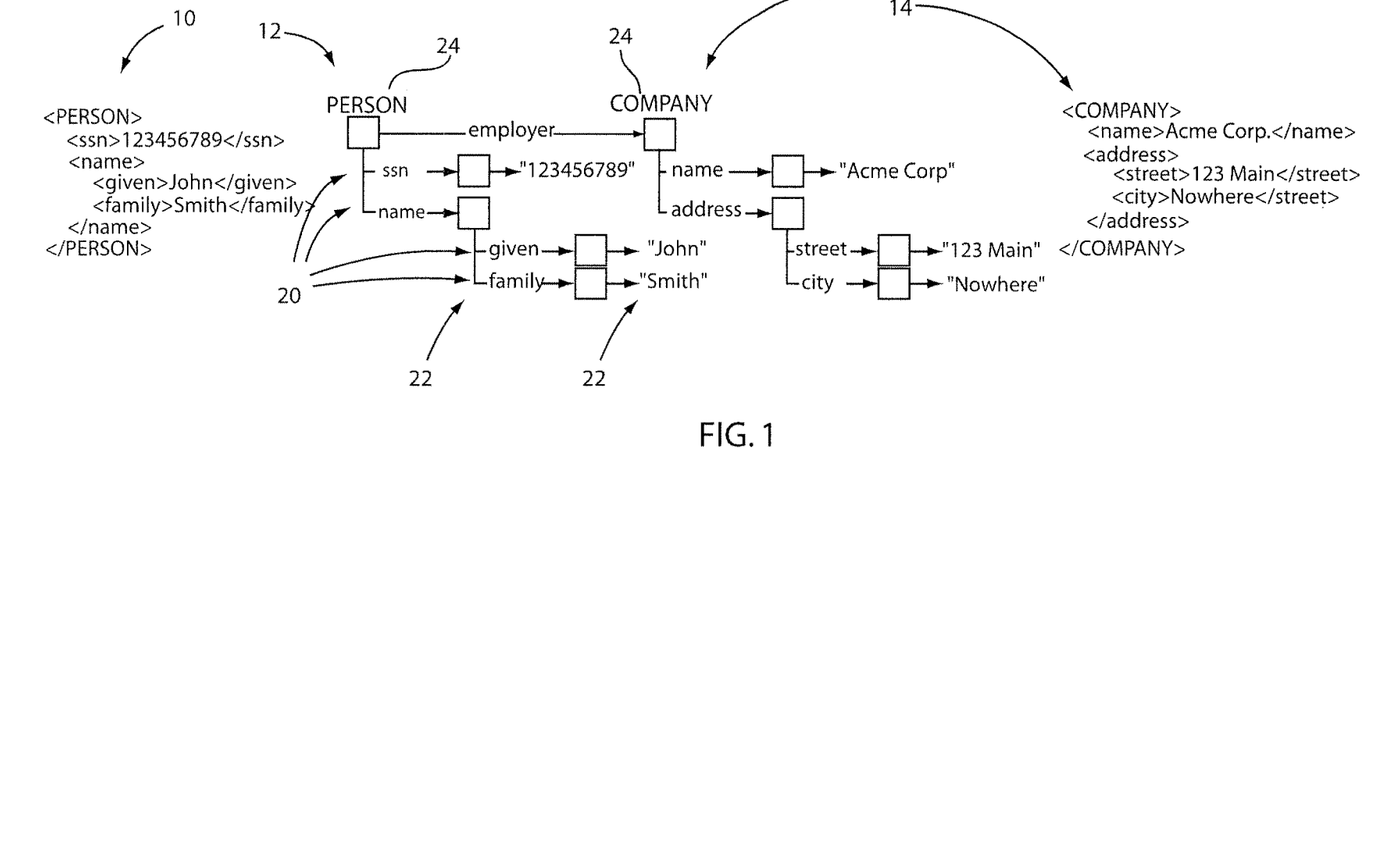
FIG. 1 is a diagram showing two XML documents and corresponding graphical representations for two resource nodes in accordance with one illustrative embodiment.

Referring now to the drawings in which like numerals represent the same or similar elements and initially to FIG.

1, a relational data model 4 is illustratively shown. Relational data model 4 illustratively includes an XML document <PERSON> 10 and its representation 12 and an XML document 14 <COMPANY> and its representation 16 are illustratively shown. Boxes in FIG. 1 represent resource nodes. Lines connecting the boxes in FIG. 1 represent triples. Resources may include triples. Heavy lines are triples that form a value tree of a resource. Class(es) 24 of a resource node are noted above the node.

Relational data: Each row 20 of a database corresponds to a resource whose value is columns 22 of that row. Updating the row corresponds to updating the value tree of the corresponding resource. This is illustrated in the End-to-end example below.

Data relevant to constructs (such as a bid construct) may be determined based on the relationships or features of resource graphs.

Execution model: The present principles include a programming model for building reactive systems. Thus, an execution model in accordance with the present embodiments, defines how the runtime state of a program changes in reaction to the occurrence of external events, such as user inputs, messages from external systems, or asynchronous internal events. The present execution model is data centric, meaning that all aspects of the execution model are described in terms of changes of the runtime state of the program. The execution model will be explained in greater detail with respect to FIG. 2.

Figure 2:
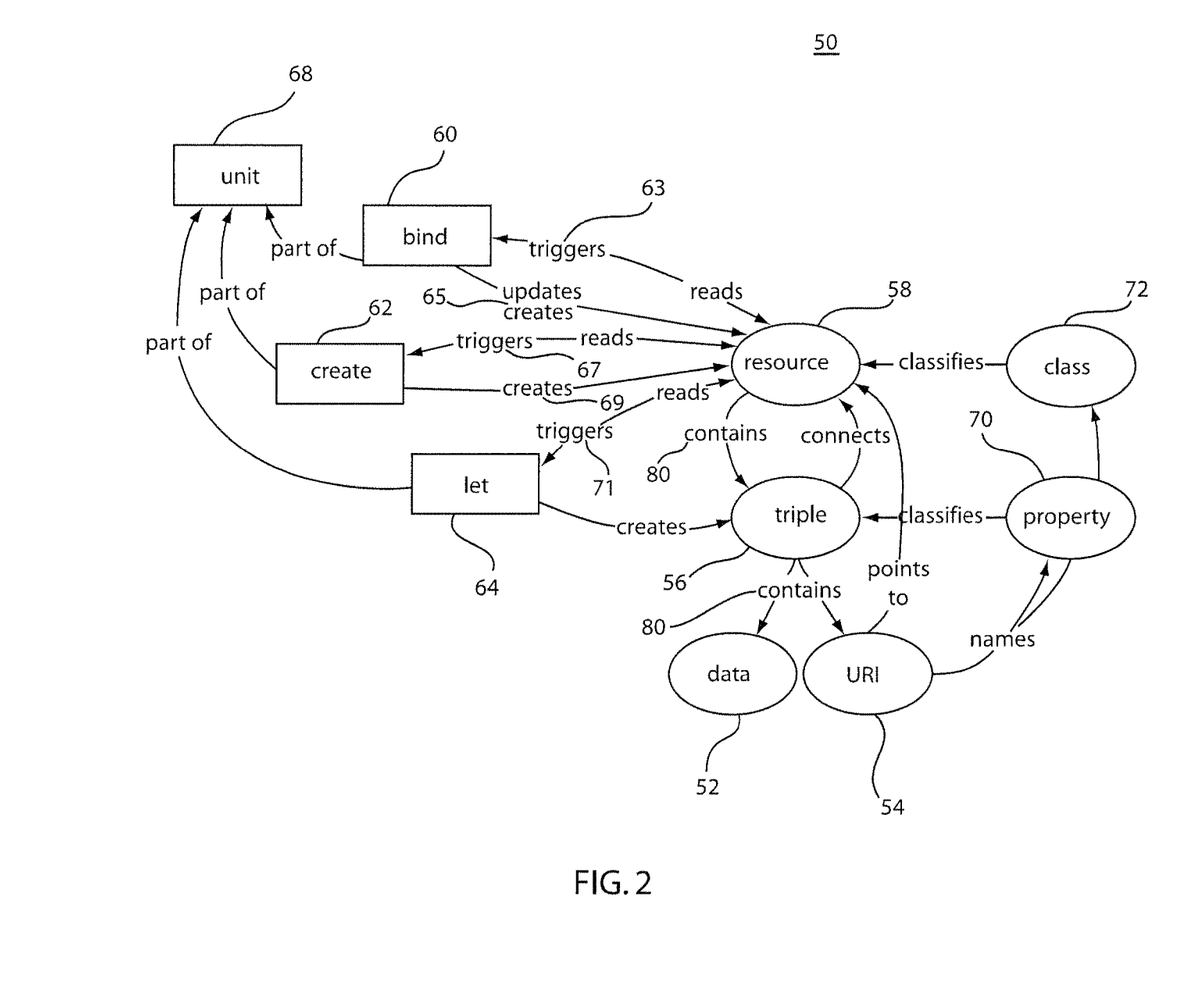
FIG. 2 is a block/flow diagram showing an execution model in accordance with one illustrative embodiment.

Referring to FIG. 2, a block/flow diagram depicts a model execution system/method 50 in accordance with one illustrative embodiment. One or more resources 58 include data 52 which may be connected or associated in triples 56. Data 58 or information for identifying data (e.g., uniform resource identifiers (URI) 54 which names classes 72 which classify resources 58 and names properties 70 which classifies triples 70) are maintained in a system. The system listens for changes in the data 52 (or 54) by identifying the contents with previously stored contents. This is indicted by "contains" 80. The "contains" operation aggregates data changes relevant to one or more binds 60. For example, if a given bind is sensitive to a particular triple (56) a change in the data (52) of the triple will cause a trigger 63. Relevant data that triggers a bind can be identified by all those triples in the RDF subtree linked to by "contains" or descendant "contains" triples.

If an asynchronous resource update is observed that is relevant to a bind, the bind 60 executes to update/create 65 the resource 58 in accordance with the data (52) change. The type and kind of data that is changed is what triggers the bind or set of binds that execute.

The bind constructs 60 are executed in dependency order. This means that the first binds 60 executed are those without dependencies on the execution of other binds, followed by binds with dependencies when the dependencies are made available by execution of other binds.

In accordance with the updates from the bind component 60, a create construct 62 is triggered 67 and creates 69 a new resource, if needed. The new resource (58) may include the updates generated by executing binds 60. Likewise, a let construct 64 is triggered 71 to create new triples 56, if needed. The new triples (56) may include new associations between old or new data (52). The bind constructs 60, create constructs 62 and let constructs 64 may be included in a same unit 68 or component, which may be stored or maintained as a stand-alone component. The create and let constructs may be repeatedly executed based upon updated resources to create new resources and triples.

The runtime state of a program comprises a set of resources and triples included in a triple store. The present embodiment provides constructs (e.g., bind, create, let) that the programmer uses to declaratively specify updates to the runtime state.

A <bind> construct declaratively specifies how the value of a resource changes in response to changes in the values of other resources, using, e.g., XQuery as a functional value computation language. Although other languages may be employed, e.g., Javascript™. The <let> and <create> constructs declaratively specify the creation of new resources, relate new and existing resources by creating and destroying triples, and change the classification of new and existing resources, all based on current resource values.

Execution is driven by updates. An update is the assignment of a value to a resource. Each external event, such as a user input, is reflected as an initiating update. In response to an initiating update, a program performs an execution cycle, hence listening for changes. An execution cycle performs a cascade of ensuing updates, as declaratively directed by the <bind> constructs of the program. After performing the resource value updates directed by the <bind> constructs, the program creates new resources, resource relationships, and classifications, as declaratively directed by the <let> and <create> constructs.

During any given execution cycle, each resource that will be updated is updated exactly once by the execution of a <bind> construct, after all input resources to that bind have been updated. Thus, each resource has a well-defined old value, which is its value prior to the start of the execution cycle; and a new value, which is its value after the completion of the execution cycle.

When a <bind> construct executes, it has access to both the old and the new values of its input resources. Binds that use new values can be used to model constraint-like updates, for example, keeping a data or presentation view in sync with the data being viewed. Binds that use old values can be used to model non-idempotent operations such as adding to a total, appending an item to a list, or inserting a record into a database.

Path expressions play a central role in the language in accordance with the present principles, for example, to identify the specific resources whose values are declaratively related by a <bind> construct. A path expression is a formula for navigating from one resource to one or more other resources via RDF triples. Path expressions are based on XPath expressions, but in accordance with the present principles XPath is generalized to permit navigation over arbitrary RDF graphs by using the mapping between RDF and XML as described above.

Figure 3:
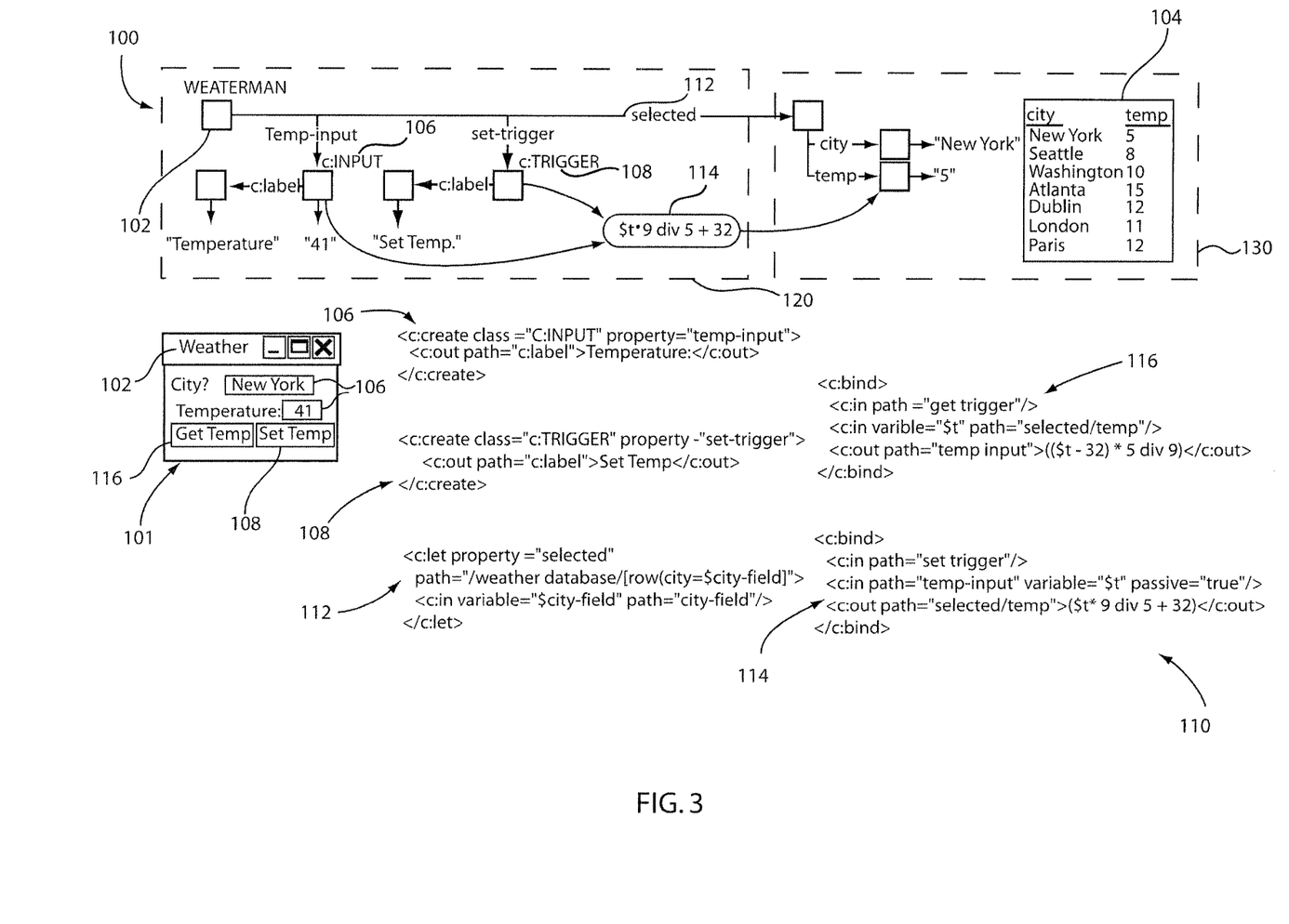
FIG. 3 is a diagram showing a form, graphs and corresponding code for an example for carrying out one illustrative embodiment.

Referring to FIG. 3, an illustrative end-to-end example shows a graph 100, an illustrative form 101 and corresponding programming code 110 to illustrate concepts in accordance with the present principles. The following example is a simple end-to-end application that provides a form 102 that permits querying and updating a relational database of weather information 104. The <create> construct associates user interface elements such as inputs 106 and triggers 108 with the WEATHERMAN resource class that represents the form. A <let> construct 112 uses the "city" input field to select a row from the database, recording it using the "selected" property. A <bind> construct 114, triggered by the "set" trigger 108, updates the database with the quantity in the "temperature" input field, after converting Fahrenheit to Celsius. A similar <bind> construct 116 retrieves the temperature from the database 104, converting Celsius to Fahrenheit.

As indicated by dashed boxes, the application may be distributed among multiple computing nodes 120 and 130, such as a browser and a server. Distributed data structures are formed by triples that connect resources with URLs residing on different computing nodes, such as 112. Distributed execution occurs when <bind> constructs that reference distributed data structures are executed, such as binds 114 and 116.

Efficient protocols to implement such distributed data and execution models are provided in accordance with present embodiments. For example, the execution of bind 114 can be accomplished, at a protocol level, by an appropriate HTTP PUT or POST operation.

Interaction model: The presentation and user interaction model provided in accordance with the present principles permits the description of user interfaces, or application "front-ends", at a range of levels of abstraction. A recursive Model View Controller (MVC) pattern is supported, permitting a developer to refine an abstract user interface description through successive levels of more concrete specification.

The model of an instance of the MVC pattern is represented by a resource. The view of MVC is a set of resources associated with the model, whose instantiation is declaratively driven by the <create> construct. The controller of MVC is a set of <bind> constructs that update the model resource in response to updates to the view resources, and vice versa. The set of resources that comprise a view of a model resource may themselves serve as models for other views, thus supporting a recursive MVC pattern (See FIG. 6). The set of resources comprising a view, together with the <bind>-based controller that connects the view resources with the model resource, may also be seen as a more concrete refinement of an abstraction represented by the model. Conversely, the model may be viewed as an encapsulation of the functionality provided by the view.

Relationship to Xforms: The present invention builds on and generalizes many of the concepts from XForms to produce a uniform programming model across all application tiers. The XML tree-based MVC design of XForms is made recursive and generalized to RDF graphs. The concept of view-model and model-model binding is expanded to a general-purpose computation model based on resource-resource binding. Data-driven user interface instantiation is generalized to declarative resource instantiation. The event-driven execution model of XForms is simplified and regularized by the data-centric update-driven execution model in accordance with the present principles.

Composition model: The declarative data and execution models in accordance with the present invention support a flexible approach to application composition. This is illustrated by some examples drawn from application front-ends. However, these programming model capabilities likewise support flexible composition in all tiers of the application.

Flexible decomposition and styling: The choice of a particular view to refine an abstract model resource is determined by the class of the model resource. The support for multiple and dynamic classification permits a great deal of flexibility in this process because the choice of specific presentation for an abstraction to be made early, by the developer of the abstraction; or later at composition time or run time by a consumer of the abstraction.

Figure 4:
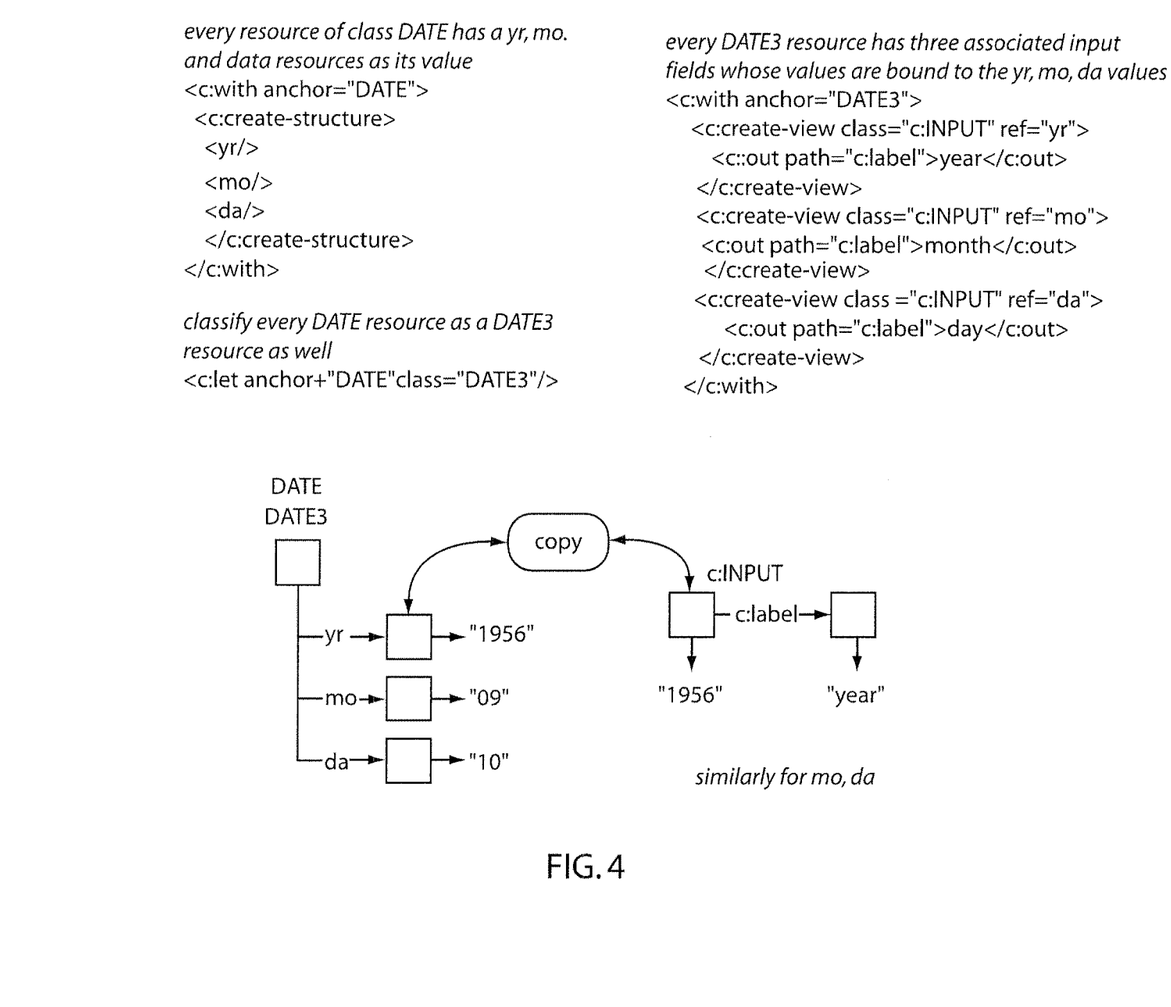
FIG. 4 is a diagram showing a compositional model with code and a corresponding graphical representation in accordance with one illustrative embodiment.

Referring to FIG. 4, for example, an interactive calendar abstraction may include a resource of class DATE whose programmatically computed value is a date to be presented to the user, and whose value is updated as a reflection of the act of choosing a date by the user. A more specific choice of presentation for a DATE model, for example, as three fields for year, month and day, may be made by classifying (either early or late) some or all DATE resources in an application with classification DATE3, and defining a set of view resources to be associated with the DATE model resource by virtue of its classification as a DATE3 resource.

Open composition and adaptation: The open approach taken by the present principles (and RDF) for definition of structure and function associated with classes supports flexible multi-organizational composition and adaptation of applications. For example, suppose that IBM partners with a book store to provide IBM employees with supplies such as books. The partnership agreement requires that IBM modify "stock" user interfaces and processes, such as adding provision to specify an IBM approver for each order. This might require that IBM insert an approver field in each submitted IBM order, and a corresponding input field into the ordering page.

Figure 5:
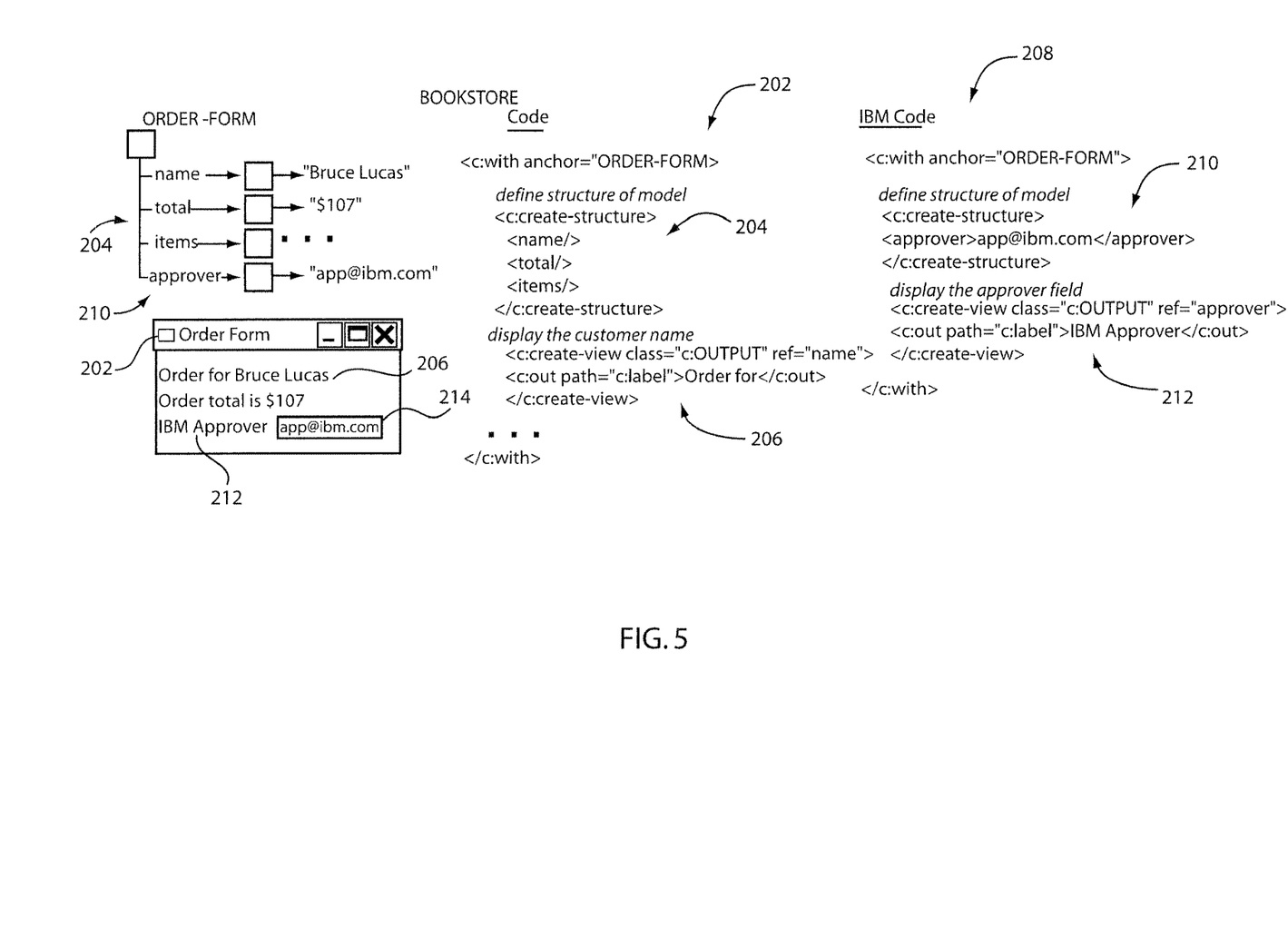
FIG. 5 is a diagram showing a form, graphs and corresponding code for an example for multi-organizational changes that can be made to resources in accordance with one illustrative embodiment.

Referring to FIG. 5, a fragment 202 of bookstore code for a customer order form is illustratively shown. Bookstore code 202 includes portions of the definition of an order form model 204 and of the order form presentation 206. Also shown is a fragment 208 of code separately specified by IBM to customize the bookstore order form 202, including the addition of an approver field 214 to the model 210 and of a corresponding presentation item 212.

Thus, while the <with> construct (202 and 208), which is an anchor construct, in accordance with the present embodiment is comparable in some respects to a class definition (of the ORDER-FORM class in the example above), it is more flexible in that it permits the complete definition of a class to be composed from multiple independently specified sources. This approach supports flexible multi-organization composition of applications.

Device Adaptation: At the most concrete end, the MVC interaction recursion is grounded in a set of built-in resource classes that may drive existing technologies such as Swing, XHTML, or VoiceXML to represent device-specific atoms of user-interaction, such as buttons, fields, and voice commands. Just above this most concrete level is a level of resource classes representing more abstract (but still primitive) units of interaction, such as input, outputs, and triggers. These primitive units of interaction are gathered together into collections of simultaneously enabled interaction, such as pages, which are sequenced in flows. Any of these levels of interaction may be connected to persistent data stores.

The present invention uses a uniform data and execution model for all levels of this recursive MVC tree, supporting flexible device adaptation by tapping into the models at any level of the tree. Thus, one approach to device adaptation could simply be to provide an alternative view to an existing model—as would likely be possible in any current MVC framework. We have the additional option of extending the model-view recursion uniformly by treating the old view as a model to a new view better suited to a mobile device. Note that it is a design decision as to whether driving the old view or providing a new one will provide a better user experience or be easier to implement. The present approach provides a spectrum of possibilities via a common set of language features.

Figure 6:
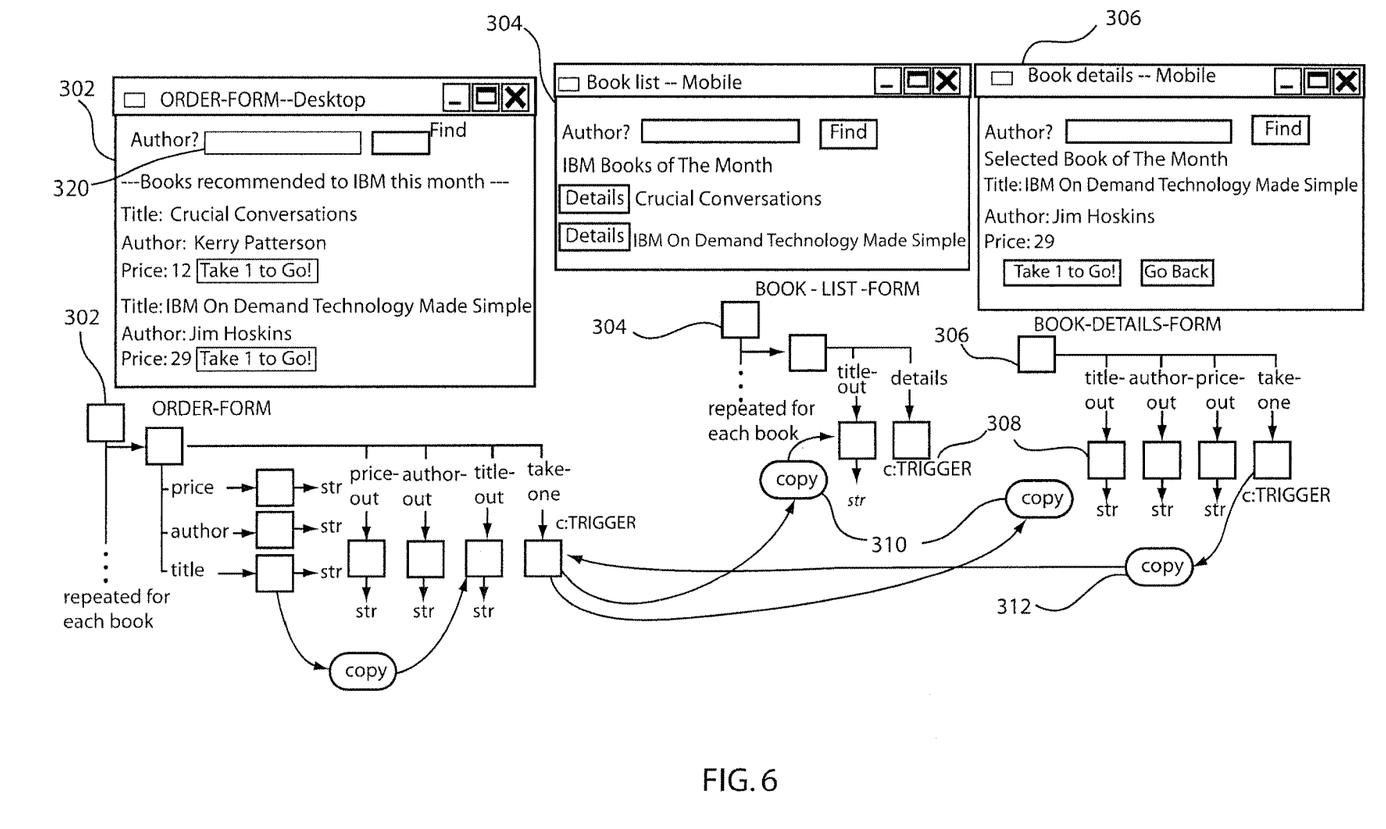
FIG. 6 is a diagram showing forms and graphs a simple page for searching for titles using different devices in accordance with a device adaptation embodiment.

Referring to FIG. 6, a simple page is shown for searching titles in the hypothetical bookstore application described above. View 302 is oriented toward a desktop device with sufficient display space to show an author search field, available categories, featured book of the month list, and details of a selected book all at the same time. Views 304 and 306 are oriented toward a mobile device. Views 304 and 306 bind to the view resources of the desktop view 302 as their model. View 304 displays a "master" list of books, while view 306 displays the details for a single selected book. The artifacts creater for this adaptation include new view element 308, "binds" 310 linking the new view to the old view and controlling navigation 312. Since these features 308, 310 and 312 are all present programming constructs in accordance with the present invention, these features remain available for still further adaptation if needed.

Figure 7:
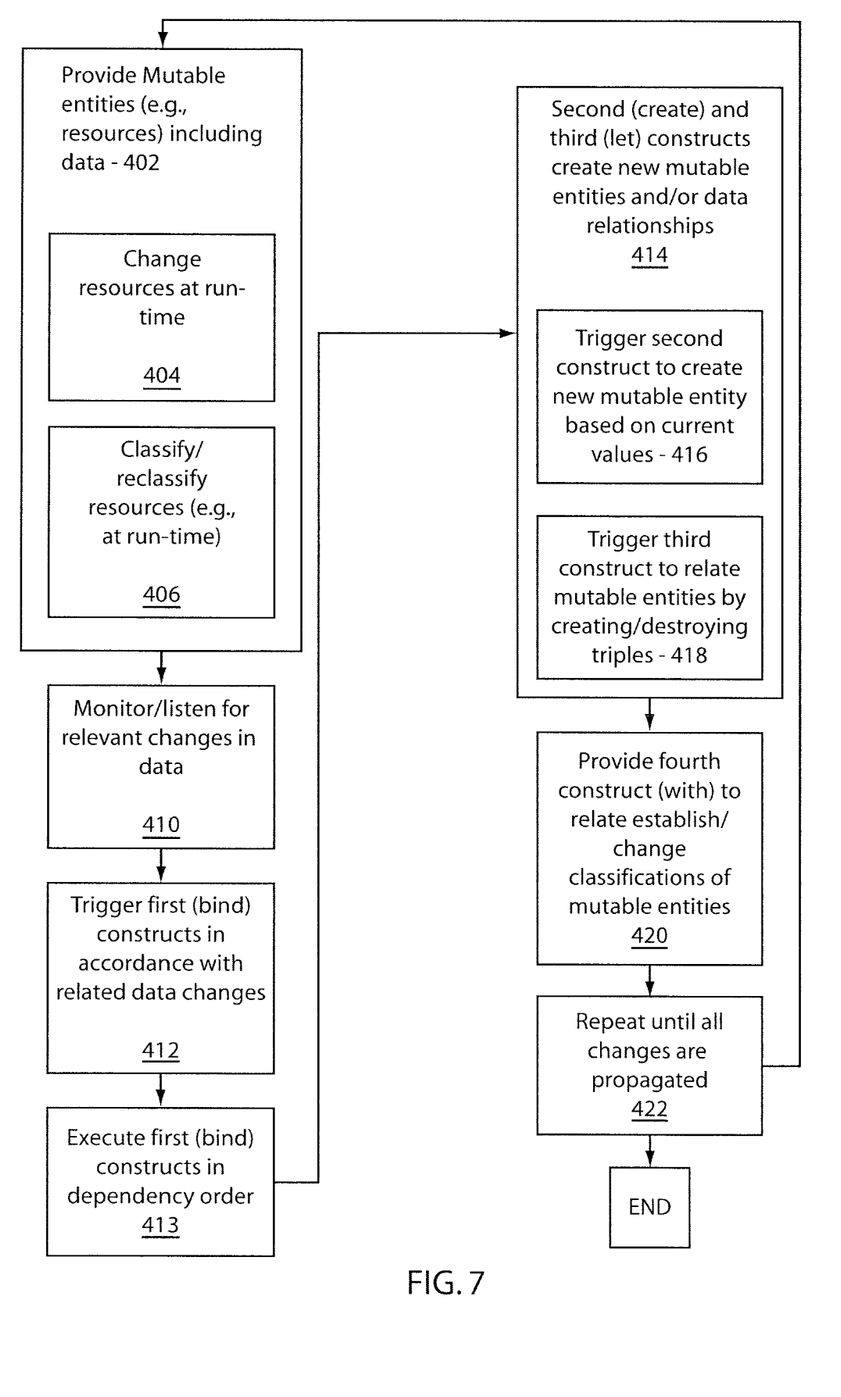
FIG. 7 is a block/flow diagram showing a system/method for managing resources in accordance with one illustrative embodiment.

Referring to FIG. 7, a system/method for managing resources in a programming environment supports enterprise, web and client applications. The system/method includes, in block 402, mutable entities are provided including related data. The related data preferable includes triples or other connected data. The data relevant to constructs may be determined based upon graph structure relationships. Mutable entities preferably include resources and more preferably RDF resources structures. The mutable entities or resources may include the capability to be programmatically changed at runtime in block 404. In block 406, the mutable entities or resources may be classified in more than one class wherein the classes of the resources may be programmatically changed at runtime.

In block 410, changes are monitored or listened for in the related data. In block 412, when a relevant change to the data is determined, a first construct, e.g., a bind construct, is triggered in accordance with the changes in the related data to update the resource or mutable entity. This includes specifying how a value of a mutable entity changes in response to the changes in the related data. The first constructs are executed in dependency order in block 413. The first construct has access to old and new values for the related data to determine the mutable entity changes. Changes in the related data may be declared active to indicate a trigger of the first construct.

In block 414, in accordance with the updated mutable entities, a second construct and a third construct may be triggered to respectively create a new mutable entity or update a data relationship. In block 416, the second construct (create) is triggered to create a new mutable entity based on current entity values. In block 418, the third construct (let) relates new and existing mutable entities by creating and destroying triples based on current entity values. The third construct connects data in triples such that same data may be employed in a plurality of ways to eliminate multiple redundant abstractions.

In block 420, a fourth construct (with) is provided and is employed to change a classification of a mutable entity based on current entity values. In block 422, the process may be repeated until all changes have been propagated in all constructs. Changes made in each construct may affect resources which may propagate through other resources. It should be noted that the constructs may be employed together or independently as needed.

Figure 8:
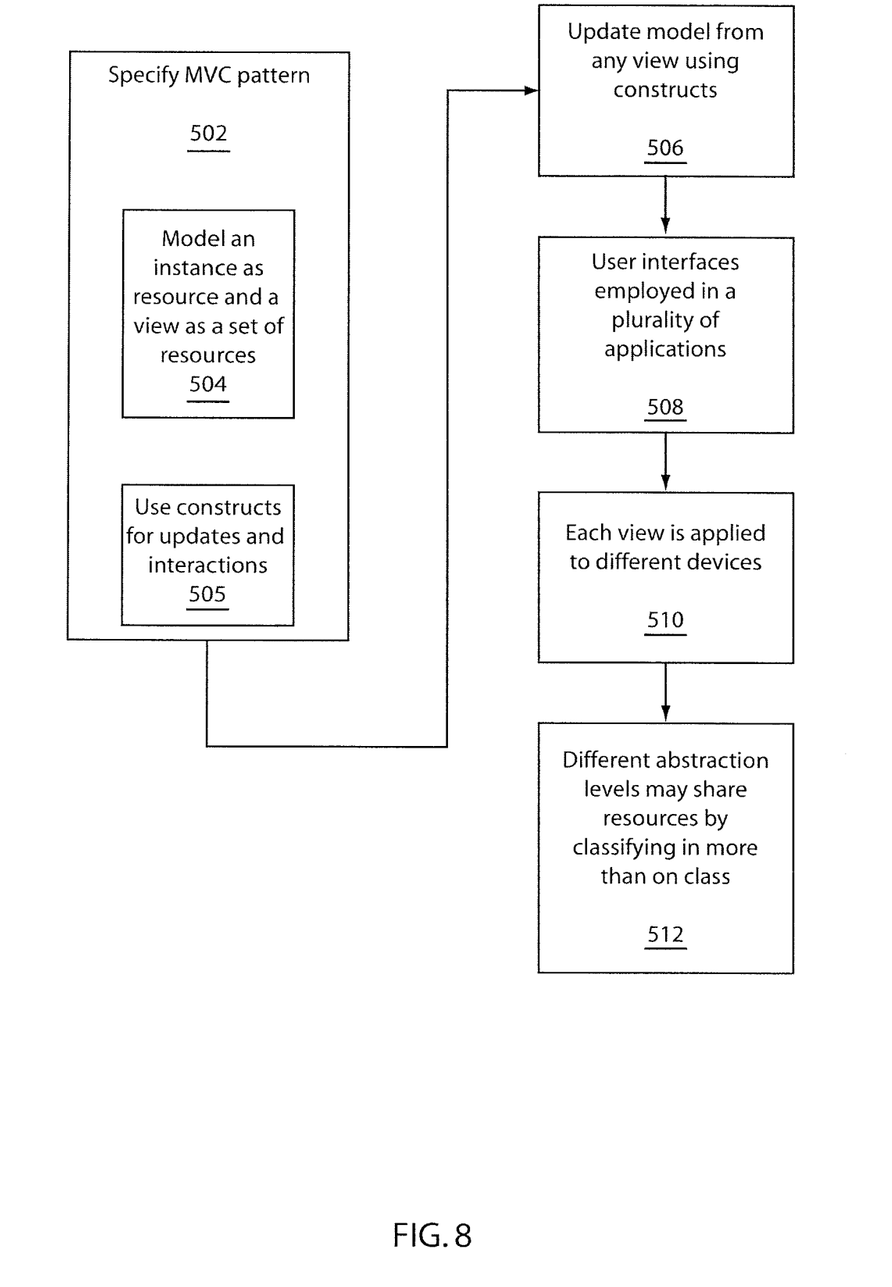
FIG. 8 is a block/flow diagram showing a system/method for managing resources for device adaptation in accordance with another illustrative embodiment.

Referring to FIG. 8, a system/method for managing resources is illustratively depicted. The system/method provides an interaction model to permit the description of user interfaces, or application "front-ends" (and back-ends), at a range of levels of abstraction. A recursive Model View Controller (MVC) pattern is specified in block 502, permitting a developer to refine an abstract user interface description through successive levels of more concrete specification. A plurality of user interfaces, business objects or data objects, etc. are specified at a plurality of abstraction levels using resource classes.

In block 504, a model of an instance of the MVC pattern is represented by a resource. A view of MVC is a set of resources associated with the model, whose instantiation is declaratively driven by the <create> construct. The controller of MVC is a set of <bind> constructs that update the model resource in response to updates to the view resources, and vice versa. In block 505, the construct interactions and resource updates may be provided as described above (See e.g., FIGS. 2 and 7). The set of resources that comprise a view of a model resource may themselves serve as models for other views, thus supporting a recursive MVC pattern (See FIG. 6). The set of resources comprising a view, together with the <bind>-based controller that connects the view resources with the model resource, may also be seen as a more concrete refinement of an abstraction represented by the model. Conversely, the model may be viewed as an encapsulation of the functionality provided by the view.

In block 506, the model is updated in response to updates in any view by providing a plurality of constructs to implement the updates. In block 508, the user interfaces are applicable to a plurality of applications. In block 510, each view may be applied to a different device. For example, computer desktops, mobile telephones, personal digital assistants or any other devices. A first view may be applied to a desktop device and a second view to a mobile device. Alternately, a first view may be applied to a first application and a second view may be applied to a second application in the same or different devices. In block 512, the different abstraction levels may share resources by classifying resources in more than one class, and the classes of the resources may be programmatically changed at runtime.

Figure 9A:
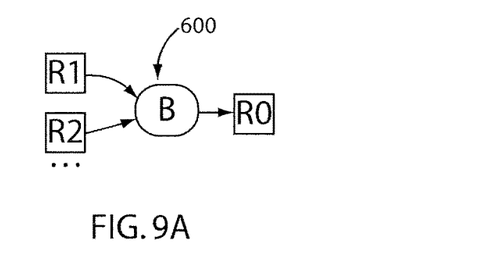
FIGS. 9A and 9B are diagrams showing a bind construct in accordance with one aspect of the present invention.
Figure 9B:
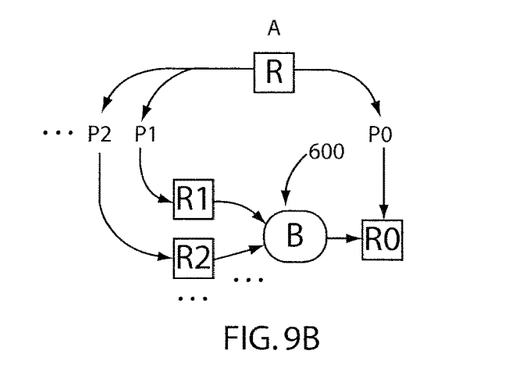

Referring to FIGS. 9A and 9B, a bind construct 600 is illustratively shown. Bind construct 600 is a declarative expression of a functional relationship (R0) between resource values (R1 and R2). Effectively, the bind construct 600 is a one-way conditional constraint on the resource values. The bind construct 600 may be triggered by an update to an input source (R). A developer specifies a function to compute output R0 from R1, R2, etc. Each input may be active or passive. An active input is an update that triggers execution of the bind construct 600. A passive input does not trigger execution of the bind construct 600. Each input may refer to its resource's new value (value at the end of the execution cycle) or old value (value at the beginning of the execution cycle). For example, the new value could be used for constraint-like computations, while the old value may be used for non-idempotent operations such as inserting a value into a set or adding to a value.

Referring to FIG. 9B, bind construct 600 is depicted with more details. For every resource R of class A, create a binding B with input resources R1, R2, etc. reachable via paths P1, P2, etc., respectively. Output resource R0 is reachable by path P0. The bind B is computable by a given expression, e.g., in XQuery. Illustrative XML code includes the following:

```
<bind anchor="A"
    <in path="P1" variable="$V1"/>
    <in path="P2" variable="$V2"/>
    ...
    <out path="P0">
        xquery expression involving $V1, $V2, ...
    </out>
<bind>.
```

Figure 10:
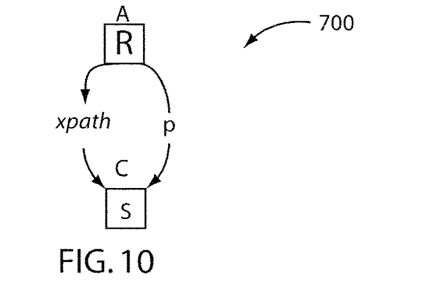
FIG. 10 is a diagram showing a let construct in accordance with one aspect of the present invention.

Referring to FIG. 10, a let construct 700 is illustratively depicted. Let construct 700 is a declarative data-driven construct for the creation of structure. The let construct 700 provides for the creations of triples to connect resources and the classification of resources, e.g., using properties and classes. For example, for every resource R of class A, and for every resource S reachable by xpath from A, classify S with class C and connect R to S with property p. Illustrative XML code includes the following:

```
<let
    anchor="A"
    path="xpath"
    property="p"
    class="C"/>
```

Figure 11:
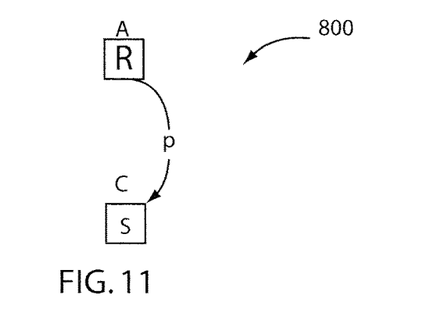
FIG. 11 is a diagram showing a create construct in accordance with one aspect of the present invention.

Referring to FIG. 11, a create construct 800 is illustratively depicted. Create construct 800 is a declarative data-driven construct for the creation of structure. The create construct 800 provides for the creation and classification of resources, e.g., using properties and classes. For example, for every resource R of class A, create a resource S and classify S with class C. Connect R to S with property p. Illustrative XML code includes the following:

```
<create
    anchor="A"
    property="p"
    class="C"/>
```

Having described preferred embodiments of a system and method for managing resources using a compositional programming model (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for managing resources in a computer programming environment, comprising:
    triggering, using at least one processor, a <bind> construct that declaratively specifies updates to a runtime state of a computer program to update one or more existing resources stored on a computer readable storage medium, the one or more existing resources including related data that includes one or more resource description framework (RDF) triples,
    wherein triggering the <bind> construct includes declaratively specifying how a value of given one of the one or more existing resources changes in response to changes in the related data of the given existing resource, and wherein the <bind> construct has access to old and new values for the related data to determine the changes in the related data of the given existing resource; and
    in accordance with at least the specified update to the given existing resource, triggering, using the at least one processor, at least one of:
        a <create> construct that declaratively specifies creation of a new resource; and
        a <let> construct that declaratively specifies an update of a data relationship including the given existing resource by creating or destroying at least one RDF triple.

2. The method as recited in claim 1, further comprising employing the one or more RDF triples in a plurality of roles in an application to support enterprise, web and client applications.

3. The method as recited in claim 1, further comprising classifying resources in more than one class.

4. The method as recited in claim 3, wherein classes of resources are programmatically changed at runtime.

5. The method as recited in claim 1, wherein the changes in the related data associated with the given existing resource are declared active to trigger the <bind> construct.

6. The method as recited in claim 1, further comprising providing a class definition that permits a complete definition of a class to be composed from multiple independently specified sources.

7. The method as recited in claim 1, further comprising employing the <bind>, <create> and <let> constructs in a plurality of roles in an application to support enterprise, web and client applications.

8. The method as recited in claim 1, further comprising changing a classification of the given existing resource based on the current entity values using the <let> construct.

9. The method as recited in claim 1, wherein related data is determined based upon graph structure relationships.

10. A computer program product for managing resources in a programming environment comprising a non-transitory computer readable storage medium including a computer readable program, wherein the computer readable program when executed on a computer causes the computer to perform steps of:
    triggering, using at least one processor, a <bind> construct that declaratively specifies updates to a runtime state of a computer program to update one or more existing resources stored on a computer readable storage medium, the one or more existing resources including related data that includes one or more resource description framework (RDF) triples,
    wherein triggering the <bind> construct includes declaratively specifying how a value of a given one of the one or more existing resources changes in response to changes in the related data of the given existing resource, and wherein the <bind> construct has access to old and new values for the related data to determine the changes in the related data of the given existing resource; and
    in accordance with at least the specified update to the given existing resource, triggering, using the at least one processor, at least one of:
        a <create> construct that declaratively specifies creation of a new resource; and
        a <let> construct that declaratively specifies an update of a data relationship including the given existing resource by creating or destroying at least one RDF triple.

11. The computer program product as recited in claim 10, further comprising classifying resources in more than one class, wherein classes of resources are programmatically changed at runtime.

12. The computer program product as recited in claim 10, further comprising providing a class definition that permits a complete definition of a class to be composed from multiple independently specified sources.

13. A method for managing resources in a computer programming environment, comprising:
    providing one or more existing resources with class definitions having related data including one or more resource description framework (RDF) triples, wherein the one or more RDF triples are included in a subset and are stored on a computer readable storage medium;

triggering, using at least one processor, a <bind> construct that declaratively specifies updates to a runtime state of a computer program to update at least a given one of the one or more existing resources in accordance with changes in the related data of the given existing resource, wherein triggering the <bind> construct includes specifying how a value of the given existing resource changes in response to the changes in the related data of the given existing resource, and wherein the <bind> construct has access to old and new values for the related data to determine the changes in the related data associated of the given existing resource; and in accordance with at least the specified update to the given existing resource, triggering, using the at least one processor, at least one of:
  a <create> construct that declaratively specifies creation of a new resource; and
  a <let> construct that declaratively specifies an update of a data relationship including the given existing resource by creating or destroying at least one RDF triple.

14. The method as recited in claim 13, further comprising providing a class definition that permits a complete definition of a class to be composed from multiple independently specified sources, wherein the multiple independently specified sources include different organizations.

15. The method as recited in claim 13, further comprising class resources in more than one class, wherein classes of resources are programmatically changed at runtime.

16. The method as recited in claim 13, wherein the changes in the related data associated with the given existing resource are declared active to trigger the <bind> construct.

17. The method as recited in claim 13, further comprising employing the one or more RDF triples and the <bind>, <create> and <let> constructs in a plurality of roles in an application to support enterprise, web and client applications.

18. The method as recited in claim 13, further comprising changing a classification of the given existing resource based on the current entity values using the <let> construct.

19. The method as recited in claim 13, wherein the related data is determined based upon graph structure relationships.

20. A computer program product for managing resources in a programming environment comprising a non-transitory computer readable storage medium including a computer readable program, wherein the computer readable program when executed on a computer causes the computer to perform the steps recited in claim 13.

* * * * *